United States Patent [19]

Pfeiffer et al.

[11] Patent Number: 4,785,473
[45] Date of Patent: Nov. 15, 1988

[54] INTERACTIVE AUDIO TELECOMMUNICATIONS MESSAGE STORAGE, FORWARDING AND RETRIEVAL SYSTEM

[75] Inventors: Randall R. Pfeiffer; Sandra S. Pfeiffer, both of Roseville, Calif.

[73] Assignee: Genesis Electronics Corporation, Folsom, Calif.

[21] Appl. No.: 675,419

[22] Filed: Nov. 27, 1984

[51] Int. Cl.⁴ .............................................. H04M 3/50
[52] U.S. Cl. ......................................... 379/89; 379/84
[58] Field of Search ................. 179/18 B, 2 DP, 6.04, 179/6.17, 5 P, 89; 379/71, 84, 88, 89, 67

[56] References Cited

U.S. PATENT DOCUMENTS

| | | | |
|---|---|---|---|
| 4,191,855 | 3/1980 | Sakai | 379/102 |
| 4,255,618 | 3/1981 | Danner et al. | 381/77 X |
| 4,523,055 | 6/1985 | Hohl et al. | 379/89 |
| 4,540,856 | 9/1985 | Fujii et al. | 379/76 |
| 4,549,047 | 10/1985 | Brian et al. | 379/88 |

OTHER PUBLICATIONS

"Voice Message Systems", Paul Mermelstein, *IEEE Communications Magazine*, Dec. 1983, pp. 8-10.

*Primary Examiner*—Thomas W. Brown
*Attorney, Agent, or Firm*—Fliesler, Dubb, Meyer & Lovejoy

[57] ABSTRACT

A voice store and forward telecommunications system that provides for the receipt, storage and retrieval of voice messages is described. The system design allows for messages to be received and stored to a mass storage device, messages and prompts to be retrieved from the mass storage device and issued, and DTMF commands to be received simultaneously with the issuance of messages and prompts without conflict. Multiple user telecommunication channels are supported by the system, all in real time. Channel interface processors communicate with a system control processor through paired message segment buffers alternately swapped into the address space of the system control processor. A directory and allocation table corresponding to the mass storage device is maintained by the system control processor in a RAM buffer to permit real time storage and retrieval of messages. A dynamic isolation and cancellation circuit is used to prevent the receipt of any message, prompt or command simultaneously issued by the system independent of any message or command being received from a user.

15 Claims, 5 Drawing Sheets

INTERACTIVE AUDIO TELECOMMUNICATIONS MESSAGE STORAGE, FORWARDING AND RETRIEVAL SYSTEM

FIELD OF THE INVENTION

The present invention generally relates to electronic telecommunications devices and systems utilized for the recording and storage of audio messages and, in particular, to those such systems that provide for the automated recording, storage, retrieval, and forwarding of voice messages by users of the system via the public telecommunications network or a private branch exchange system, or both.

BACKGROUND OF THE INVENTION

The telecommunications field is expanding as greater emphasis is placed on obtaining and sustaining efficient exchange of information between decision makers. To understand the reasons for this increasing emphasis, complex, often subtle and subjective issues of sociology and economics must be examined. However, the end result is easy to discern. There is an increasing need for providing an efficient system for enhancing the interpersonal telecommunications between those involved in day-to-day decision making.

One substantial growth area involves voice telecommunications systems that provide for the storage, retrieval, forwarding and distribution of audio or voice messages to people participating in a common telecommunications network. In the extreme, the simplest forms of such systems are characterized as telephone answering machines that sequentially store audio messages for subsequent manual or remotely instigated playback. Substantially more complex implementations of such systems provide for the forwarding or effective routing of a particular voice message to a group of people all serviced by a common message storage and retrieval system. This naturally has the advantage of providing for the instant distribution of information in a form that is immediately reviewable simply by the subsequent act of the intended recipients in retrieving the messages.

An additional functionality provided by advanced telecommunications message storage, retrieval and forwarding systems is the provision for recognizing tone-based commands. These systems permit a remote user to respond to command request messages issued by the system with conventional telephone keypad generated tone commands. The command request message issued may state a number of alternate command possibilities, such as requesting the recording and storage of a new message, forwarding a message from one intended recipient to another, and terminating the current command request sequence. Each command request option presented to the recipient is typically associated with a particular keypad number. As is well known, each keypad number generates a distinct tone that is provided onto the telecommunications network. The message system detects and decodes the tone to ascertain the corresponding command request number. Consequently, a limited degree of interactive operation may be realized by the use of such systems.

A number of interrelated problems of practical consequence and substantial human factors importance continue to limit the effective use of such prior art systems. Perhaps principal among these problems is that such systems are typically not intuitively natural to use. Often, tone command selection and issuance must be reserved by the user until after the entire command request message has been issued by the system. This contributes to a slow, somewhat clumsy usage capability that may tend to frustrate the user particularly when the command selection is known by the user prior to the issuance of the command request message.

Another distinct problem in the operation of such systems is commonly referred to as response latency. This relates to the system's response time in procuring the next message from its message storage unit for issue to the user. Response latency may be particularly frustrating to a user since the underlying purpose of the system is to provide fast, efficient voice message storage, forwarding and retrieval. Response latency periods appear to the user as wasted periods of time wherein no usable function is served either by them or on their behalf. Perhaps even more significant is that response latency is an indication of limited throughput in the message retrieval and issuance system. Consequently, the overall responsivity of such systems will typically degrade as the total number of voice messages stored and concurrent usage of the system by multiple users increases.

A further related problem is that advanced prior art systems typically provide only a fixed performance level. However, such systems may be utilized in a wide variety of circumstances where such quantifiable features as voice quality and total message storage capacity may be subject to varying human factors considerations. Unfortunately, such parameters and others are typically fixed and therefore rarely optimized for any particular system installation.

In addition to the foregoing typical problems, which are by no means exhaustive, there are additional real-world concerns relating to the overall system complexity and cost. While not necessarily an exact measure, system complexity provides an indication of system reliability. This issue again touches on the underlying purpose of such systems to provide immediate and therefore always available interpersonal communication capabilities. Limited reliability, of course, will effectively negate these desired capabilities.

System complexity also typically provides an indication of cost. The cost issue is of particular concern in that the system's resources must always be available to potential users in keeping with the underlying immediate access purpose of the system. However, the usage level of such systems, simply in terms of the total time it is actively used, is typically low. Thus, the cost of the system is desirably minimized for the relatively effective use of its cost-equivalent.

SUMMARY OF THE INVENTION

It is therefore a general purpose of the present invention to provide a convenient, readily usable, highquality voice message storing, forwarding and retrieval system.

This is accomplished in the present invention by providing a telecommunications system for obtaining, storing and issuing messages, the system comprising means for storing messages and means for obtaining and issuing messages to and from a user and for transferring the messages to or from the message storing means, the obtaining means including a plurality of message storage buffers for storing respective portions of each message as obtained by the obtaining means and as transferred from the message storing means and means for managing the buffers so as to permit the transfer of a message portion between any one of the buffers and the message storing means while obtaining or issuing another message portion with respect to another one of the buffers.

Thus, an advantage of the present invention is that it permits flexible, interactive, real-time operation with no discernible latency, particularly in response to user commands.

Another advantage of the present invention is that it provides for variable voice quality in both recording and subsequent voice generation so as to permit maximal utilization of the message storage subsystem.

A further advantage of the present invention is that it utilizes multiple double-buffered interface processors in its preferred embodiment to optimize the operation of the system control processor in servicing each of the interface processors.

Still another advantage of the present invention is that it permits fully interactive operation in that user commands may be issued to and recognized by the system regardless of the then current operation of the corresponding interface processor.

A still further advantage of the present invention is that it permits fully symmetrical operation of the system in that it may initiate a telecommunications exchange with the user for immediate remote forwarding of messages, as well as acting as a message storage and retrieval system.

Yet still another advantage of the present invention is that it provides for the foregoing advantages and others in a design-efficient and cost-effective manner.

BRIEF DESCRIPTION OF THE DRAWINGS

These and other attendant advantages of the present invention will become apparent and readily appreciated as the same becomes better understood by reference to the following detailed description when considered in connection with the accompanying drawings, in which like reference numerals designate like parts throughout the figures thereof, and wherein.

DETAILED DESCRIPTION OF THE INVENTION

Figure 1:
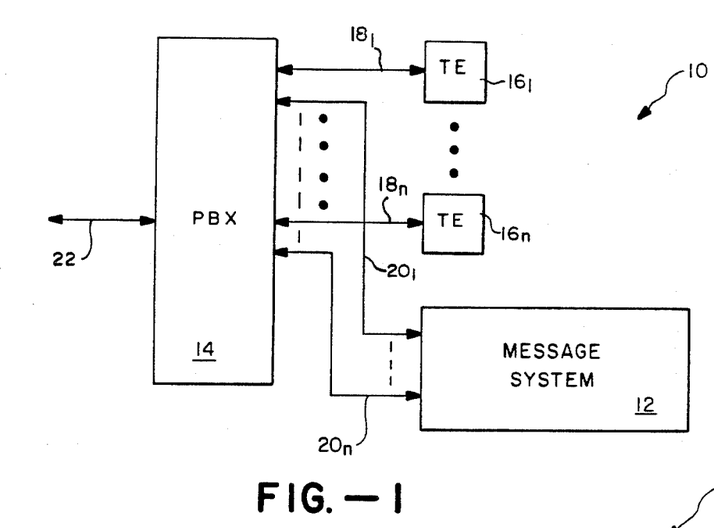
FIG. 1 is a simplified block diagram of the implementation of the present invention in combination with a private branch exchange telecommunications network system.

FIG. 1 is a block diagram illustrating the preferred installation of the present invention as an adjunct to a private branch exchange (PBX) telecommunications network 10. Such PBX networks 10 typically include a PBX switching system 14 interconnected between a central office branch line 22 and a number of terminal equipment (TE) units, or telephones, $16_{1-n}$. Each terminal equipment unit $16_{1-n}$ is conventionally connected via respective lines $18_{1-n}$ to the PBX switching system 14. The message system 12 of the present invention is similarly connected by respective lines $20_{1-n}$ to the PBX switching system 14. As will be described in greater detail below, each terminal equipment unit $16_{1-n}$ preferably operates substantially in parallel with a corresponding unit of the message system 12. This parallelism is supported by the PBX switching system 14 either by treating each corresponding pair of lines $18_{1-n}$ and $20_{1-n}$ as connected to terminal equipment responding to a common access, or telephone, number. This results in common signals being provided on each line of the pair of lines $18_{1-n}$, $20_{1-n}$. Alternately, the PBX switching system 14 may treat each line $18_{1-n}$ and $20_{1-n}$ as corresponding to respective access codes and providing for the automated switching of an access request from a non-responding terminal equipment unit $16_{1-n}$ to its corresponding unit within the message system 12.

Figure 2:
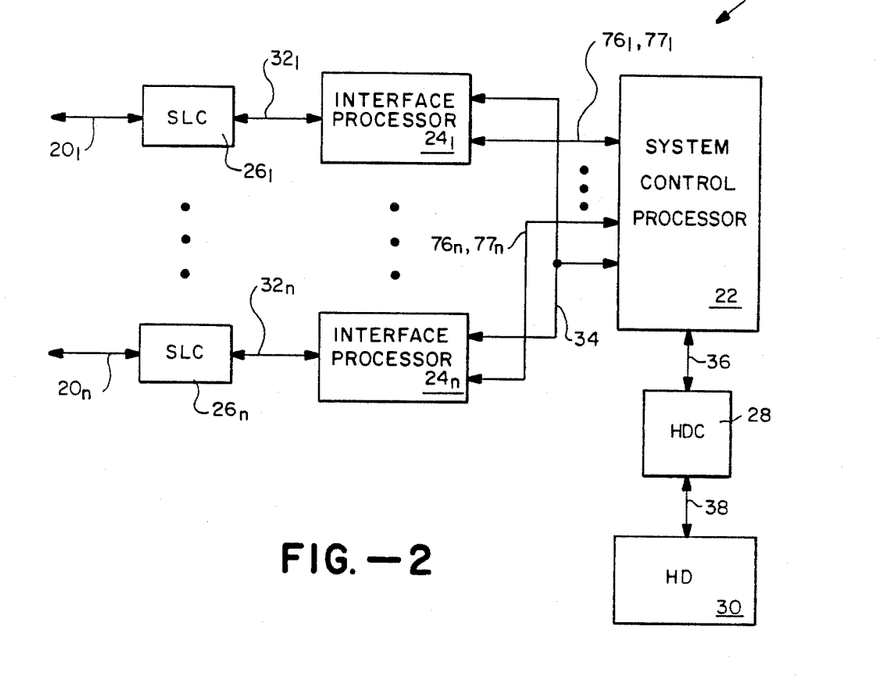
FIG. 2 is a simplified block diagram of the principal components of the present invention.

A preferred embodiment of the message system 12 is detailed in FIG. 2. The message system 12 includes a master system control processor 22 connected via control and data lines 36 to a mass storage hard disk controller unit 28 that is further connected via control and data lines 38 to a mass storage hard disk drive 30. The hard disk controller 28 and drive 30 together form a high-capacity, high-speed message storage subsystem that operates under the direct control of the system control processor 22.

A number of interface processors $24_{1-n}$ are connected to the system control processor 22 via a multifunction bus 34 and respective select line pairs $76_1$, $77_1$–$76_n$, $77_n$. Each interface processor $24_{1-n}$ is associated with a respective terminal equipment access line $20_{1-n}$ via respective multifunction analog buses $32_{1-n}$ and subscriber line circuits $26_{1-n}$. These subscriber line circuits $26_{1-n}$ may be of conventional design for providing the standard analog signals "ring", and "voice" via the analog multifunction buses $32_{1-n}$ to the interface processors $24_{1-n}$. Further, the subscriber line circuit $26_{1-n}$ should nominally accept a conventional "off-hook" signal provided by its corresponding interface processor $24_{1-n}$ again via the multifunction bus $32_{1-n}$.

The message system 12 operates to record, store, retrieve, issue and forward voice messages obtained via the interface processors $24_{1-n}$. For example, in response to the detection of a "ring" access request by a subscriber line circuit 26, the associated interface processor 24 provides an "off-hook" signal to the subscriber line circuit 26 and appropriately notifies the system control processor 22 of the access in progress. The system control processor 22 responds by retrieving an appropriate introductory message from the message storage subsystem 28, 30 and passing the voice message to the interface processor 24 for presentation to the access requester, or user, via the subscriber line circuit 26. The voice message so issued may include a command request by presenting a number of message system function options to the user. Commands so solicited may be directed to identifying a message system user, leaving a message for the identified user, retrieving a message directed to the accessing user, rerecording a previously recorded message and terminating the current message exchange. Each option is voiced with a corresponding keypad number for selection by the accessing user. The corresponding tone generated by an option selection, or keypress, is received and decoded by the interface processor 24 and, again, notifies the system control processor 22 of the selection. In response, the system control processor may retrieve another message from the message storage subsystem 28, 30 for transfer to the accessing user via the interface processor 24 or begin recording and transferring a message to the message storage subsystem 28, 30, along with an identifying tag indicating the intended recipient, as it is processed through the interface processor 24.

In order to avoid any appreciable response latency, the system control processor 22 must service each interface processor $24_{1-n}$ with sufficient frequency to permit effectively continuous message transfers between the active interface processors $24_{1-n}$ and their associated subscriber line circuits $26_{1-n}$. As will be described in greater detail below, the interface processors $24_{1-n}$ are provided with status registers that are sequentially polled by the system control processor 22. It is through these status registers that the interface processors $24_{1-n}$ notify the system control processor 22 of access requests, message requests, message availability, and commands issued by the accessing user.

In order to promptly service all of the interface processors $24_{1-n}$, in accordance with the preferred embodiment of the present invention, each voice message transferred through an interface processor $24_{1-n}$ is segmented. This allows the system control processor 22 to transfer or receive a respective message segment from each of the interface processors $24_{1-n}$ at a rate equal to or greater than the rate that any one interface processor $24_{1-n}$ can process a message segment being issued to or received from its associated subscriber line circuit $26_{1-n}$. Consequently, the message system 12, in accordance with the present invention, incurs no response latency regardless of the length of any particular voice message.

Figure 3:
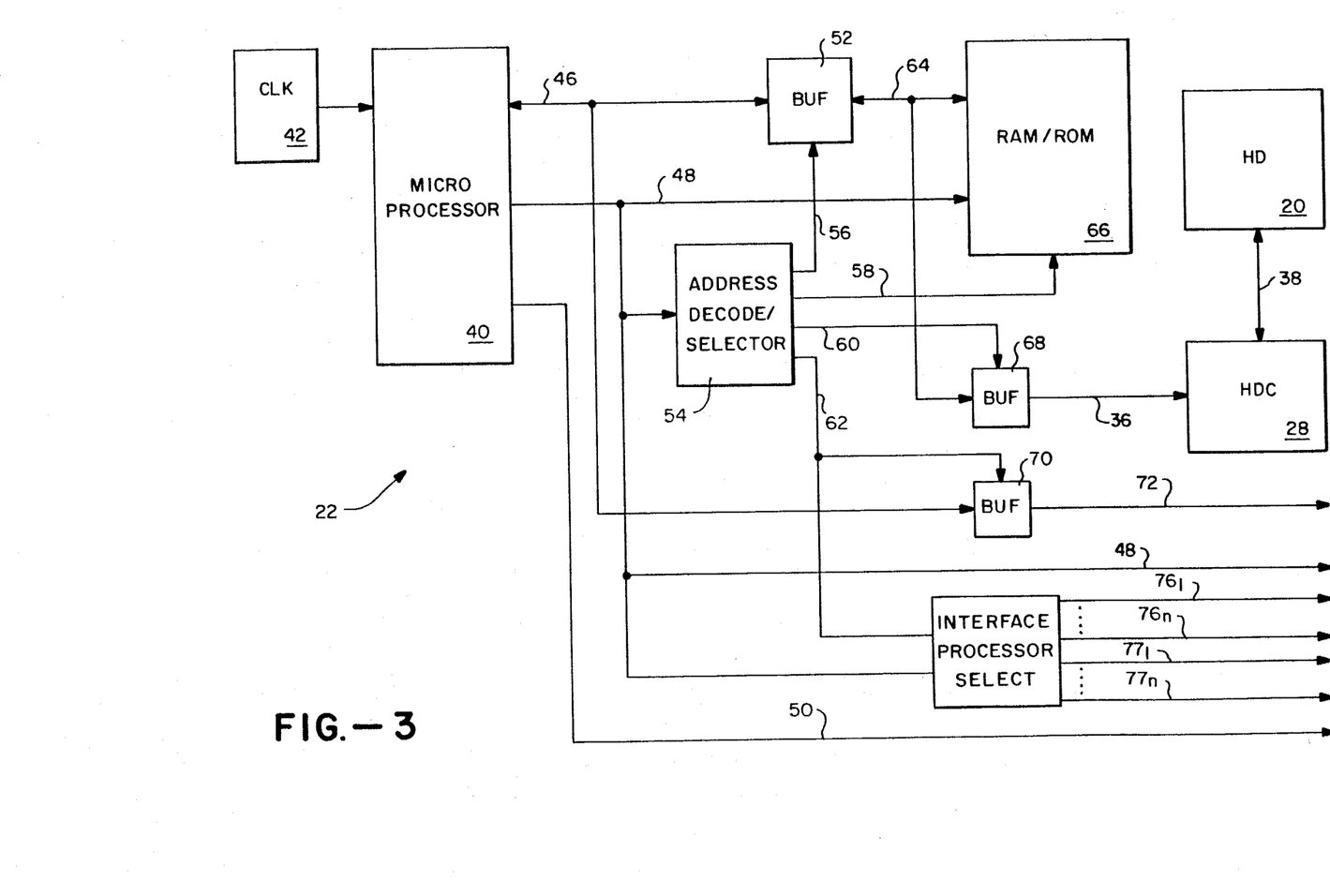
FIG. 3 is a block diagram of the system control processor of the present invention.

The system control processor 22 is shown in greater detail in FIG. 3. In particular, the system control processor 22 includes a conventional microprocessor 40 such as a Motorola 6809. The microprocessor 40, driven by a conventional clock circuit 42 in response to a clock signal provided via line 44 at a frequency of preferably 8 Mhz operates to execute a program stored in a conventional RAM/ROM integrated circuit unit 66. The RAM/ROM unit 66 is also utilized to store the directory and storage allocation information pertinent to the message storage subsystem 28, 30, operating parameters specific to each currently active interface processor $24_{1-n}$ and temporarily buffered voice message segments as received or awaiting transfer to the various active interface processors $24_{1-n}$.

As in conventional microprocessor systems, an address decoding selector 54, responsive to addresses provided on the address bus 48 by the microprocessor 40, is provided to enable the appropriate addressed bank of the RAM/ROM unit 66 via signal on line 58 and to enable the memory data bus buffer 52 so as to transfer data between the microprocessor data bus 46 and the buffered memory data bus 64. In accordance with the preferred embodiment of the present invention, the selector 54 also controls access to the message storage subsystem 28, 30 and the multifunction digital bus 34 by a technique commonly referred to as memory mapping. That is, sections of the addressable memory space of the microprocessor 40 are allocated specifically to non-memory peripheral devices, such as the hard disk controller 28. However, these peripheral devices appear to the microprocessor 40 simply as memory locations, thereby substantially simplifying data transfers from such devices as the hard disk controller 28 to the RAM/ROM unit 66. Accordingly, provision of an address within the address space allocated for the hard disk controller 28 is decoded by the selector 54 so as to provide an appropriate enable signal on line 60 to the hard disk data bus buffer 68 as well as line 56 to the memory data bus buffer 52, thereby establishing a direct data path between the hard disk controller 28 and the microprocessor 40. Since a select signal is not provided on line 58 to the RAM/ROM unit 66, there is no contention for the buffered data bus 64 during such a transfer. Similarly, addresses provided by the microprocessor 40 within the allocated address space of the interface processors $24_{1-n}$ result in the provision of a select signal on line 62 to the interface processor data bus buffer 70 and the interface processor select circuit 74. The interface data bus buffer 70, when enabled, buffers data between the data bus portion 72 of the multifunction digital bus 34 and the microprocessor data bus 46. The select signal on line 62 also enables the further decoding of the address provided on address bus 48 to the selector 74 to select a particular one of the interface processors $24_{1-n}$ by an appropriate signal on one of the select lines $76_1, 77_1$–$76_n, 77_n$. The remainder of the multifunction digital bus 34 includes the address bus 48 and the microprocessor read/write and status port bus query signals on lines 50, 79 respectively.

Figure 4:
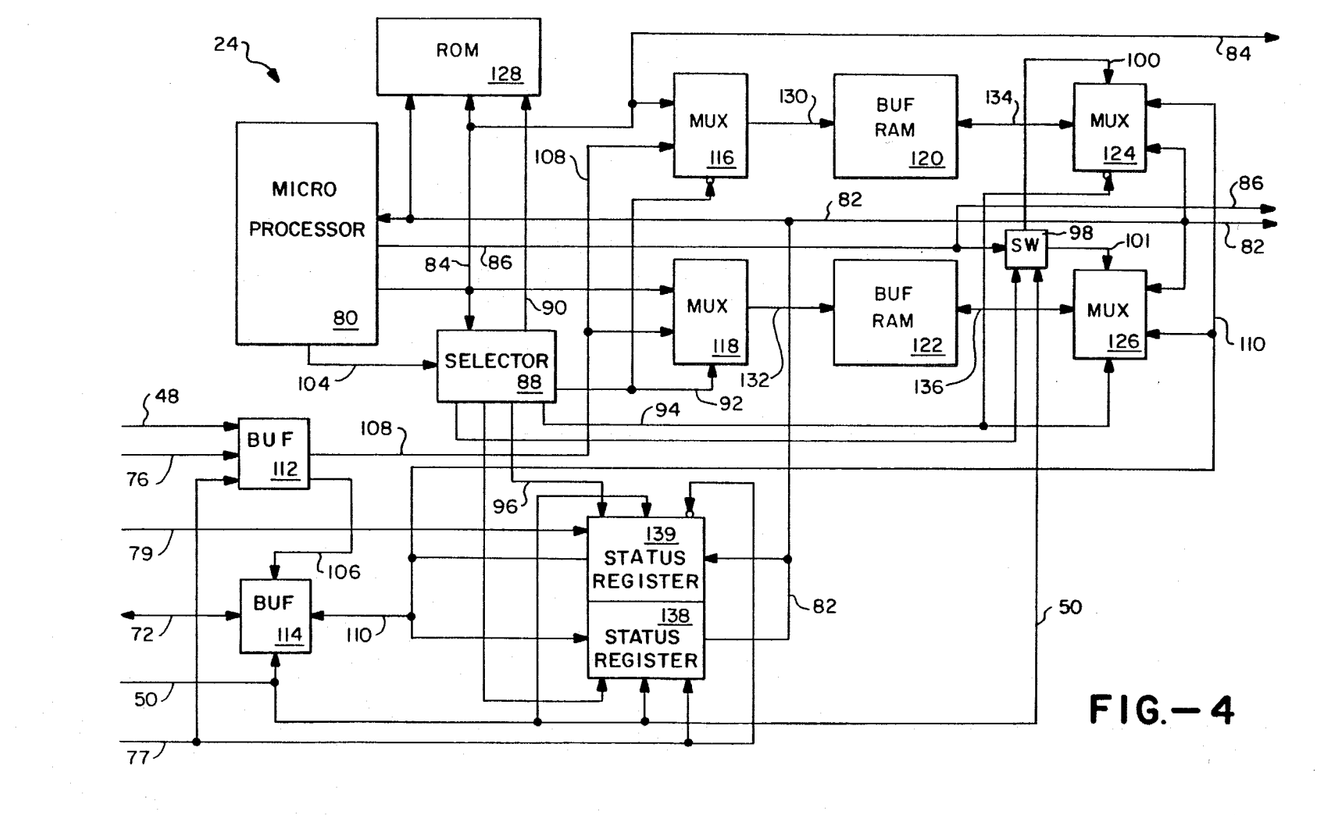
FIG. 4 is a block diagram of the data buffering portion of an interface processor in accordance with a preferred embodiment of the present invention.
Figure 5:
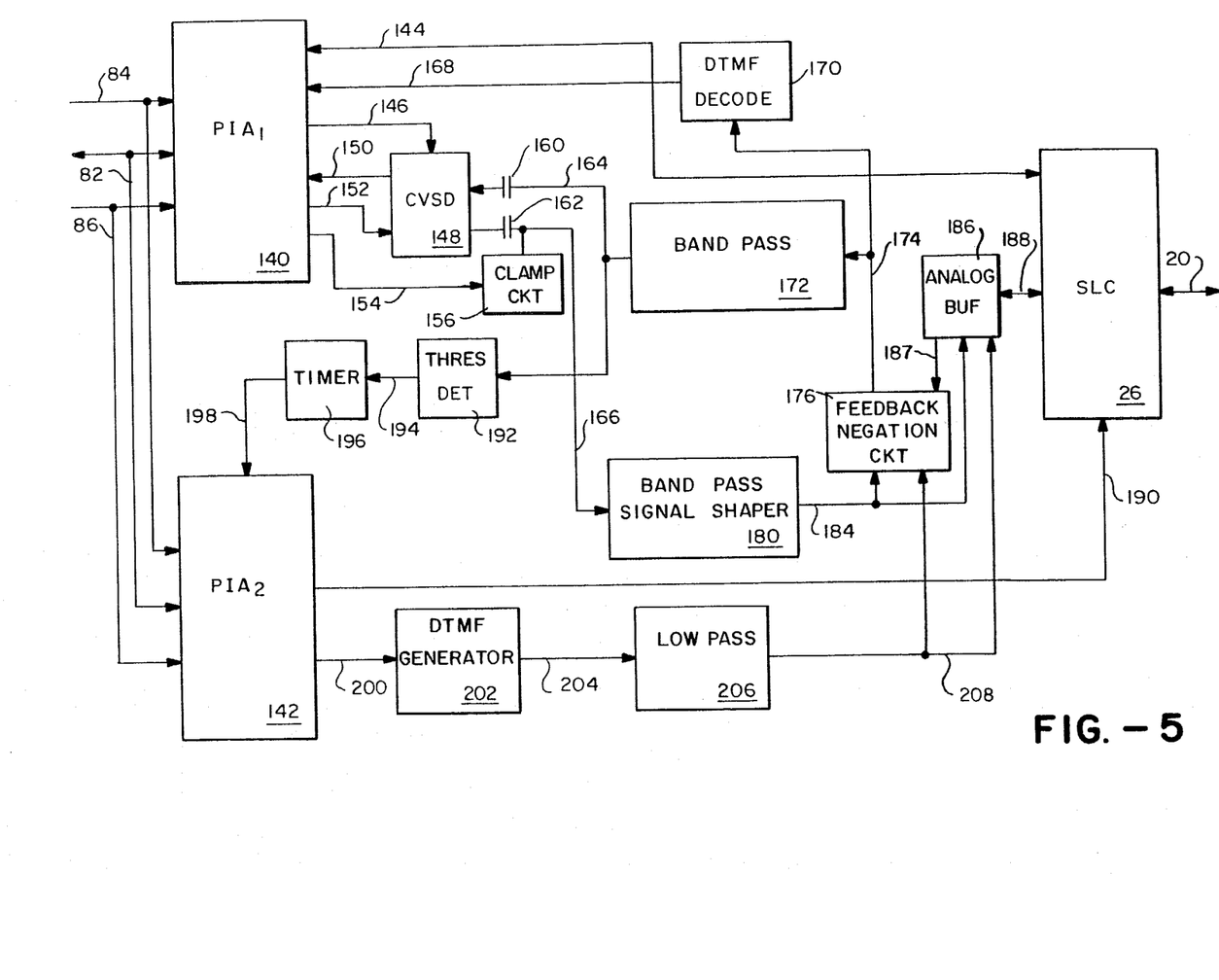
FIG. 5 is a block diagram of the digital/analog audio portion of an interface processor in accordance with a preferred embodiment of the present invention.

A representative interface processor 24 is shown in FIGS. 4 and 5. Considering first FIG. 4, the interface processor 24 preferably includes address and data bus buffers 112, 114, status registers 138, 139 and two multiplexed buffer memory RAMs 120, 122. Preferably, the RAMs 120, 122 are conventional static memory circuits, such as Advanced Micro Devices 9128 chips, having data storage capacities of 16 K bits per chip. These buffer memories are efficiently utilized for temporarily storing respective voice message segments. The interface processor 24 further includes a microprocessor 80 of conventional design, such as a Motorola 6802, a control program ROM 128 and an address decoder selector circuit 88.

The function of the dual message-segment buffers 120, 122 is to permit a voice message segment transfer between the system control processor 22 and the interface processor 24 concurrently with a separate voice message segment transfer between the interface processor 24 and subscriber line circuit 26. In accordance with the preferred embodiment of the present invention, the microprocessor 80 of the interface processor 24 and the system control processor 22 both share multiplexed, mutually exclusive access to both of the buffer memories 120, 122. This allows the system control processor 22 to access and, for example, fill buffer memory 122 with a voice message segment while the microprocessor 80 is transferring a separate voice message segment from the buffer memory 120 to the subscriber line circuit 126. In greater detail, access to the buffer memories 120, 122 by the system control processor 22 is provided by the address multiplexers 116, 118 and data multiplexers 124, 126. The external address buffer 112, as enabled by an appropriate signal on its associated interface processor/buffer memory select line 76 buffers an address from the address bus 48 of the multifunction bus 34 to a respective input of the address multiplexers 116, 118 via bus 108. The interface processor/buffer memory select signal on line 76 is preferably itself buffered and ultimately provided onto line 106 as an enable signal for the external data bus buffer 114. When enabled, the external data bus buffer 114 transfers data between the data bus 72 of the multifunction bus 34 and the auxiliary internal data bus 110. The external data bus buffer 114 is connected by this auxiliary internal data bus 110 to a respective input/output port of the data multiplexers 124, 126 as well as the input of status register 138 and the output of status register 139. The direction of the data transfer over the auxiliary data bus 110 is governed by the state of the processor read/write signal as provided on line 50 of the multifunction bus 34. Similarly, addresses from the microprocessor 80 of the interface processor 24 are provided as the second respective input of the address multiplexers 116, 118 via address bus 84 while the data bus 82 of the microprocessor 80 is connected to the second respective input/output ports of the data multiplexers 124, 126.

The selector circuit 88, particularly in response to a buffer swap select bit provided via line 104 and the current microprocessor address provided via line 84, provides an address multiplexer select signal on line 92 to multiplex addresses provided by the microprocessor 80 onto one of the buffered address buses 130, 132 while the system control processor provided addresses are multiplexed onto the other one of the buffered address buses 130, 132. Similarly, the selector circuit 88 provides a multiplexer select signal on line 94 so as to connect the auxiliary data bus 110 to the one of the buffered data buses 134, 136 corresponding to the buffer memory 120, 122 effectively addressed by the system control processor 22 while connecting the microprocessor data bus 82 to the other one of the buffer data buses 134, 136. Read/write signals provided to the data multiplexers 124, 126 via lines 100, 101, as derived from the read/write signal of the microprocessor 80 provided on line 86 and the system control processor read/write signal provided on line 50, are appropriately swapped by the swap circuit 98 in response to a swap select signal provided by the selector 88. That is, the swap circuit (SW) 98 routes the read/write signal on line 86 to the data multiplexer 124, 126 corresponding to the buffer memory 120, 122 selected for access by the microprocessor 80. Analogously, the read/write signal on line 50 is routed to the other data multiplexer 124, 122. In this manner, both the system control processor 22 and the microprocessor 80 of the interface processor 24 have concurrent but completely separate access to their respective buffer memories 120, 122. The specific one of the two buffer memories 120, 122 accessible by each, however, is determined by the buffer select bit established by the microprocessor 80 on line 104.

The status registers 138, 139, as noted above, provide for status communication between the interface processor 24 and the system control processor 22. The microprocessor 80 may write status data to the register 139 by addressing the its corresponding memory location of the register 139 and performing a status word write operation whereby the selector 88 decodes the address of the status register 139 and provides a register write enable signal via line 96. Alternately, the microprocessor 80 may read a status data word as provided by the system control processor 22 from register 138 by appropriately addressing the register 138 and performing a read operation whereby the selector 88 again appropriately decodes the address and provides a register output enable signal via line 102.

In a similar manner, the system control processor 22 may read and write data to the status registers 138, 139 of the interface processor 24. By selecting the interface processor status registers 138, 139 via an appropriate interface status port select signal on line 77 that additionally provides the buffer enable signal on line 106 to the external data bus buffer 114, a status word can be written to the register 138 by the performance of a write operation by the system control processor 22. The status register 139 can be similarly read by again providing an appropriate status port select signal on the interface status port select line 77 and, additionally, providing a bus query signal on a control line 79 of the multifunction bus 34, to enable the output of the status latch 139 onto the auxiliary data bus 110, as the system control processor 22 performs a memory read operation. Consequently, the operation of the status registers 138, 139 as between the system control processor 22 and each of the interface processors $24_{1-n}$ are mutually independent, thereby allowing substantial independence and flexibility in their cooperative operation.

It is significant to note that, in the operation of both the microprocessor 80 of the interface processors $24_{1-n}$ and the system control processor 22, the buffer memories 120, 122 occupy common respective address spaces. In each interface processor $24_{1-n}$, buffer memory selection by the selector circuit 88 is controlled by the non-address buffer select bit on line 104. Thus, each buffer memory 120, 122, when selected for access by the microprocessor 80, will occupy the same memory space in the memory address spaces in its interface processor 24. Consequently, performance of buffer memory management by the microprocessor 80 is substantially simplified. Additionally, as the buffer memory 120, 122 accessible by the system control processor 22 appears at a dedicated portion of the system control processor's memory space, there is virtually no management responsibility on the part of the system control processor 22 over the various buffer memories 120, 122 of the interface processors $24_{1-n}$ other than simply selecting a particular one of the interface processors $24_{1-n}$ for access. Consequently, operation of the system control processor 22 is substantially simplified through the use of the preferred double-buffered, buffer-swapping design of the present invention.

Considering now the remainder of the interface processor 24 as illustrated in FIG. 5, the data and address buses 82, 84 and the read/write control line 86 from the microprocessor 80 are provided to parallel port adapters 140, 142. In accordance with the preferred embodiment of the present invention, these parallel port adapters 140, 142 are conventional Motorola 6821 peripheral interface adapter circuits. Preferably, the connection of the address bus 84 to the parallel adapters 140, 142 is asymmetric such that the respective parallel ports of the parallel adapters 140, 142 appear at different discrete memory locations within the memory space of the microprocessor 80.

The first parallel adapter 140 preferably operates to process voice messages prior to their transfer to the microprocessor. An inbound, or incoming, voice message is received from the subscriber line circuit 26 via the analog "voice" line 188 and provided to a analog buffer circuit 186. The inbound voice message is further passed through the feedback negation circuit 176 and to the band-pass circuit 172 via analog signal line 174. The band-pass filter 172 is preferably of a conventional second-order design having 3 dB rolloff corners at 40 and 2,000 Hz. The filtered signal is subsequently provided via line 164 to the continuously variable slope delta modulation (CVSD) circuit 148 after any DC component is effectively removed by the blocking capacitor 160. The CVSD circuit 148 may be a conventional Harris Semiconductor 55564 circuit that provides for slope difference digital encoding of an analog signal provided thereto. The digitally encoded serial signal is then provided to the parallel adapter 140 via line 150. The digital encoding of the analog voice message signal is accomplished by the CVSD circuit 148 by continuously sampling the applied signal at a bit rate established by a clock signal provided on line 146 by the parallel adapter 140. During each clock cycle, the slope of the applied analog signal is determined with respect to its slope during the previous clock cycle and then represented as a digital logic one for an increased slope value and as a logic zero for a decreased slope value. Thus, the encoded digital signal directly reflects variations in the applied signal waveform.

The microprocessor 80 receives the digital serial inbound voice message on the single bit line 150 of a parallel port of the parallel adapter 140. Preferably, the microprocessor 80 executes a timing loop that utilizes a single output bit of the parallel port to effectively provide the bit rate clock signal on the clock line 146 to the CVSD circuit 148. Further within this timing loop, the digital voice message signal is sampled from the input line 150 and partitioned into parallel data words. These data words are in turn sequentially transferred by the microprocessor 80 to its accessible buffer memory 120, 122. As a voice message segment sufficient to fill a buffer memory 120, 122 is obtained, or on detecting the end of a voice-message, the microprocessor 80 reads the status data word from the register 138 to determine the availability of the other buffer memory 120, 122 to be filled. This availability condition is established by the system control processor 22 once it has serviced its available buffer 120, 122 of the interface processor 24 and, preferably prior to the microprocessor's 80 reading of the register 138. On determining that the other buffer 120, 122 is available, the microprocessor 80 complements the state of the buffer select bit provided on line 104 to swap the buffer memories 120, 122. A status data word is then written to the status register 139 reflecting the availability of a voice message segment in the buffer memory 120, 122 accessible by the system control processor 22. As the high-speed servicing of the interface processors 24 by the system control processor 22 has a worst-case service cycle time less than the best rate that the microprocessor 80 may obtain a voice message segment, each voice message segment made available to the system control processor 22 will be appropriately transferred without possibility of loss. Preferably, the nominal worst case service cycle time is of the order of 0.5–0.6 seconds longer only under unusual circumstances as the occurrence of a soft error condition in accessing the message storage subsystem 28, 30, while a voice message segment has a time length of approximately 0.78 to 1.4 seconds, with a nominal time length of 0.9 seconds.

In the preferred embodiment of the present invention, the use of the CVSD circuit 148 is complimented by the use of a clamp circuit 156 attached to the CVSD output line 166 and responsive to a signal provided as a parallel output bit of the parallel adapter 140 on line 154. The clamp circuit 156 shorts the CVSD output signal on line 166 through capacitor 162 to the analog ground potential whenever a voice message is being received and recorded. This is preferred as the CVSD circuit 148 nominally echoes a received analog signal from its input line 164 onto its output line 166.

To issue an outbound voice message from the interface processor 24 to the subscriber line circuit 26, a serial data stream is provided from a single bit of a parallel output port to the CVSD circuit 148 via line 152. The digital serial data stream is obtained by the microprocessor 80 from its accessible buffer memory 120, 122 and bit shifts successive data words onto the output serial bit line 152. Data bits are shifted out during respective cycles of a timing loop performed by the microprocessor 80 that, again, further provides for the issuance of the bit rate clock on clock line 146. The CVSD circuit 148 converts the digital serial data stream to an analog voltage whose slope progressively increases and decreases in accordance with the binary bit value of the serial digital data stream during the corresponding clock period. For outbound voice messages, the clamp circuit 156 is not activated, thereby allowing the reconstituted analog voice message to pass to the band-pass/signal shaping circuit 180 via line 166. A conventional band pass signal shaping circuit 180 may be utilized to smooth the analog signal produced by the CVSD circuit 148 and ultimately provide a more pleasing issued voice quality. Preferably, this band pass/signal shaping circuit 180 includes second-order high and low pass filters having 3 dB rolloff frequencies of 40 and 2,000 Hz. The output of the band-pass/signal-shaping circuit 180 is provided on line 184 to the feedback negation circuit 176 and the analog buffer circuit 186. As the "voice" analog line 188 of the subscriber line circuit 26 is effectively bidirectional, the outgoing voice message is fed back via line 187 to the feedback negation circuit 176. As will be described in greater detail below, the analog signals provided to the feedback negation circuit 176 on lines 184 and 187 are in this case combined to cancel each other so as to effectively prevent further feedback of the outbound voice message onto the analog signal line 174.

Consequently, the microprocessor 80 operates to sequentially read data words from its accessible buffer memory 120, 122 and provide them for digital-to-analog conversion via the parallel adapter 140. As each accessible buffer memory 120, 122 is emptied by the microprocessor 80, the buffers 120, 122 are swapped and a status data word is written to the status register 139 reflecting a request of the system control processor 22 to provide the next successive outbound voice message segment.

A particularly advantageous feature of the present invention is realized through the utilization of the parallel adapter 140 in generating the bit rate clock on clock line 146 as a result of a software timing loop. Preferably, the system control processor 22 may write a status data word to the status register 138 of the interface processor 24 reflecting an order to change the period of the bit rate clock provided on line 146. Such orders for changing the bit rate clock are recognized by the microprocessor 80 by reading the status control register 138 upon swapping the buffer memories 120, 122. In response, the microprocessor 80 appropriately adjusts the period of its timing loop cycle. Thus, each subsequent operation of obtaining or issuing a voice message segment by the microprocessor 80 is performed at the most recent bit rate ordered by the system control processor 22. This allows every incoming and outgoing voice message, or part thereof, to be obtained or issued at its own separately selectable bit rate. In particular, the desired aspect of this bit-rate selection is to modify the tradeoff in the effective voice quality of the voice message issued or obtained to the amount of message subsystem storage capacity required for the storage of the voice message. That is, the preferred extremes of the bit rate clock extend from a high-quality voice at 21,000 b/s to a minimal quality voice at 12,000 b/s, the nominal bit rate preferably being 18,000 b/s, that respectively require greater, lesser and nominal amounts of data storage.

Figure 6:
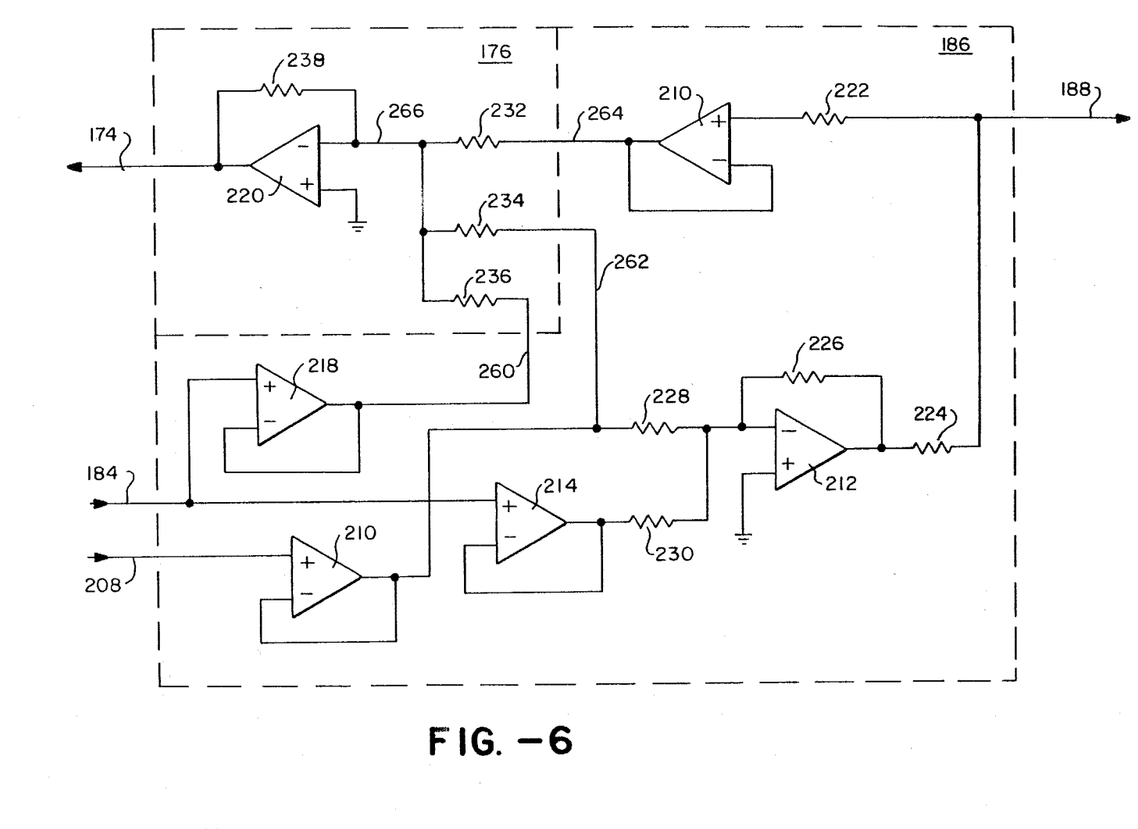
FIG. 6 is a circuit diagram of a message and tone feedback negation circuit as implemented in a preferred embodiment of the present invention.

Referring to FIG. 6, the feedback negation circuit 176 and analog buffer circuit 186 are shown in detail. The feedback negation circuit 176 includes a conventional operational amplifier 220 configured as an signal inverting summation amplifier. One of the inputs to the feedback negation circuit 176 is provided from the outbound voice message analog line 184 via the voltage follower configured operational amplifier 218 and subsequently provided on line 260 to resistor 236. The same analog signal present on line 184 is further buffered by a second voltage follower configured operational amplifier 214 and provided, via resistor 230, as one of two inputs to an inverting summation configured operational amplifier 212. Nominally, where no analog signal is present on line 208 to be buffered by voltage follower configured operational amplifier 216 and provided as a respective input to the operational amplifier circuits 220 and 212 via respective resistors 234 and 238, the analog outbound voice signal from line 184 ultimately constitutes both inputs to the feedback negation circuit 176. That is, the output of the summing amplifier 212 is provided to the bidirectional "voice" line 188 and feeds back via resistor 222 through voltage follower configured op amp 210 as an input on line 264 to the inverting summing amplifier 220 via resistor 232. As this signal has been once inverted by the operational amplifier circuit 212 with respect to the signal provided on line 260, the sum of the two signals will negate one another, provided proper summing resistor values have been chosen. These preferred resistor values are provided in Table I:

TABLE I

| 228 = 2.7 k-ohms | 222 = 10 k-ohms |
|---|---|
| 230 = 2.7 k-ohms | 232 = 4.7 k-ohms |
| 226 = 10 k-ohms | 234 = 2.22 k-ohms |
| 224 = 560 ohms | 236 = 2.7 k-ohms |

Again referring to FIG. 5, the present invention provides for the detection of user-issued, tone-based commands in addition to obtaining and issuing voice messages. Tone-based commands are preferably generated through the use of an ordinary keypad tone generator standard as part of a conventional telephone desk unit. The tones generated by each key of the keypad are distinct and distinguishable by a dual-tone multifrequency decoder (DTMF) circuit 170 as received via the analog signal line 174, feedback negation circuit 176, analog signal line 187, analog buffer 186 and, ultimately, the "voice" line of the subscriber line circuit 26. Preferably the DTMF decode circuit 170 is of conventional design. Each tone, as it is received, is decoded based on its frequency to a 4-bit-wide code that is in turn provided to the parallel adapter 140 via the digital tone code bus 168. Preferably, then the microprocessor 80 samples the state of the digital tone code bus 168 during each cycle of its timing loop and, on the determined presence of a received code command, writes a status data word to the status register 139 reflecting the particular command received. Thus, the command is made immediately available for subsequent handling by the system control processor 22.

By the particularly advantageous provision of the feedback negation circuit 176, tone commands issued by the user may be readily distinguished from the analog signal present on the bidirectional analog "voice" line 188. That is, an outbound voice message transfer may be in progress when the tone command is issued. However, the feedback negation circuit 176 functions to selectively filter the outbound voice message from the inbound analog signal, resulting in the provision of the tone command alone on the analog signal line 174. Consequently, tone commands are readily distinguishable regardless of the current function of the microprocessor 80.

The parallel adapter 142 is provided principally to drive a touch-tone generator (TTG) digital-to-analog 202 via parallel data bus 200. The TTG 202 is utilized to generate conventional DTMF tones on analog signal line 204. These tones are subsequently smoothed by low-pass filter 206 and ultimately provided on line 208 to the feedback negation circuit 176 and analog buffer circuit 186 for subsequent issuance on the analog "voice" line 188 to the subscriber line circuit 26. This preferably allows the message system 12 to perform message forwarding by instigating a telecommunications transfer whereby a telephone call is effectively placed by an interface processor $24_{1-n}$ and an interactive dialog between the receiving user and message system 12 ensues.

Additionally, the peripheral adapter 142 is utilized to detect a silence timeout signal provided on line 198 as generated by a threshold detector 192 from the output signal of the band pass 172 and processed by a timer circuit 196. That is, the threshold detector 192 provides a reset signal via line 194 to the timer 196 when an analog signal is present on line 164. Whenever such a signal is detected, the timer 196 is restarted without issuing a silence timeout signal on the line 198. Conversely, the timer 196 times out absent a detected analog signal and provides its output timeout signal to the parallel adapter 142. The microprocessor 80 may periodically sample this single bit parallel adapter input, as provided on line 198, and utilize it, for example, to detect the end of a voice message as may result from an unexpected termination of the telecommunications link. As before, the function of the feedback negation circuit 176 in receiving the DTMF signal provided on line 208 is to cancel the feedback that results from the bidirectional nature of the "voice" line of the subscriber line circuit 26. This effectively prevents the DTMF decoder 170 from improperly receiving tone commands as generated under the direction of the microprocessor 80.

Further, optional, functions of the parallel adapters 140, 142 may include supporting additional control lines 144, 190 connected to the subscriber line circuit 26.

Thus, a high-quality voice message storage, forward and retrieval system that is flexible, interactive and provides fully real-time operation with no discernible response latency has been described.

From the foregoing discussion of the many aspects and features of the present invention, as exemplified by its preferred embodiment, it is readily apparent that many modifications and variations are possible and may be resorted to by those skilled in the art without departing from the nature and scope of the present invention.

It is therefore to be understood that, within the scope of the appended claims, the invention may be practiced otherwise than as specifically described above.

We claim:

1. A telecommunications system for the store and forward transfer of messages with respect to a plurality of user channels, said system comprising:
   (a) means for storing messages;
   (b) means for transferring messages with respect to said user channels, said transferring means including a plurality of processor means for segmenting respective messages received from said user channels and for serially sending message segments of respective messages to said user channels, each said processor means including a status interface for buffering status signals posted by its said processor means and a pair of message segment buffers for use in receiving and sending message segments with respect to said processor means and said storing means; and
   (c) means for transferring message segments between said messages storing means and an alternating respective one of each said pair of said message segment buffers, each said pair of said message segment buffers being identically addressable by said message segments transferring means so as to appear to be a single addressable message segment buffer, said message segments transferring means transferring single memory segments to or from said message segment buffers in response to status signals buffered by their respective said status interfaces, said messages transferring means including means for storing message directory and allocation storage data for messages stored by said messages storing means to enable the real time storage and retrieval of messages to and from said messages storing means by said messages transferring means.

2. The system of claim 1 wherein each said processor means is coupled to a respective one of said user channels, wherein message segments are buffered in each of said processor means only in their respective said message segment buffers, wherein said status interfaces of said processor means are writable by said messages transferring means for the posting of control signals, wherein said processor means are responsive to the control signals posted to their respective said status interfaces and wherein said status interfaces are accessible only to their respective said processor means and said message segments transferring means.

3. The system of claim 2 wherein said user channels are respective full duplex voice channels capable of sourcing a plurality of channel commands and wherein each said processor means further includes:
   (a) means for isolating a receive direction half duplex voice channel from a respective full duplex voice channel and for cancelling from said receive direction half duplex voice channel any message segments transferred by said processor means to said respective full duplex voice channel; and
   (b) means, receiving said receive direction half duplex voice channel, for decoding said channel commands.

4. The system of claim 3 wherein each said processor means further includes conversion means, coupled to its respective said receive direction half duplex voice channel, for continuously variable rate analog/digital conversion of messages, the analog/digital conversion sample rate of said conversion means being controlled by said processor means.

5. The system of claim 4 wherein each said processor means further includes generation means, coupled to said respective full duplex voice channel, for continuously variable rate digital/analog conversion of message segments, the conversion sample rate of said generation means being controlled by said processor means, the conversion sample rate of said conversion and said generation means being controlled by said message segments transferring means for each message received and each message segment sent.

6. A voice message system for transferring messages among users comprising:
   (a) user interface means for providing a plurality of user connections for transferring messages from or to users;
   (b) storage means for storing a plurality of messages;
   (c) a plurality of interface processor means for managing the transfer of messages to and from said user interface means, said interface processor means being coupled to respective said user connections, each said interface processor means including:
      bidirectional first buffer means connected at first times to said user interface means for message transfers between said first buffer means and said user interface means, and at second times to said storage means for message transfers between said first buffer means and said storage means,
      bidirectional second buffer means connected at second times to said user interface means for message transfers between said second buffer means and said user interface means, and at first times to said storage means for message transfers between said second buffer means and said storage means, and
      interface control means for determining said first and said second times; and
   (d) system control means for controlling said storage means and for communicating with said interface control means of said plurality of interface processor means, said system control means providing commands to and receiving requests and status information from said interface control means to coordinate the accessing of the respective said buffer means and said storage means in support of the transfer of messages with respect to said users in real time, each said interface control means selecting the one of their respective said bidirectional first and second buffer means for access by said system control means during their respective said first and second times.

7. The system of claim 6 wherein said user connections are full duplex bidirectional channels and wherein said users may issue commands to said interface processor means via said user connections, each said interface processor means further including:
   (a) means for isolating a receive direction half-duplex channel from a respective said full duplex bidirectional channel, said isolating means subtracting out messages transferred to said full duplex bidirectional channel from said buffer means; and
   (b) means, coupled to said receive direction half-duplex channel, for decoding user issued commands.

8. The system of claim 7 wherein each said interface processor means further includes:

(a) first converter means, coupled between said receive direction half-duplex channel and said buffer means, for continuously variable rate analog/digital conversion of messages as received from said receive direction half-duplex channel, said first converter means being responsive to its respective interface control means for control of its rate of analog/digital conversion as selected by said interface processor means in response to a command issued by said system control means; and (b) second converter means, coupled between said full duplex bidirectional channel and said buffer means, for continuously variable rate digital/analog conversion of messages as received from said buffer means, said second converter means being responsive to its respective interface control means for control of its rate of digital/analog conversion as selected by said interface processor means in response to a command issued by said system control means.

9. The system of claim 8 wherein said buffer means provide for the successive transfer of message segments, wherein said system control means periodically services said interface control means for the transfer of message segments, wherein said system control means services each said buffer means during said first and second times, and wherein said bidirectional first and second buffer means are co-extensively addressed by said system control means, the addressed access of either said first or second buffer means by said system control means being determined by said interface control means of the respective said interface processor means.

10. The system of claim 9 wherein said system control means includes high-speed means, relative to said messages storage means, for storing data, said system control means utilizing said high-speed means for the storage of a message directory and corresponding space allocation data of said messages storage means, whereby said system control means directly accesses message storage locations within said messages storage means to directly store or retrieve message segments.

11. A store/forward system for managing the transfer of messages and the receipt of messages and commands with respect to a plurality of full duplex message channels, said system comprising:
(a) storage means for storing messages;
(b) control means for managing the transfer of messages to and from said storage means; and
(c) interface means for transferring messages between said message channels and said control means, said interface means including a plurality of interface processor means, respectively coupled to a like plurality of said message channels, for processing messages into message segments for transfer to said storage means and for processing message segments into messages upon transfer to said message channels, each said interface processor means including means for subtracting out the receipt of a message from a respective message channel where said message is being simultaneously transferred to said respective message channel by its said interface processor means, whereby a command is received in isolation from any message being transferred to the same said message channel.

12. The system of claim 11 wherein said storage means includes a plurality of message segment storage locations, exclusive sets of said message segment storage locations storing respective messages and wherein said control means includes high-speed means, relative to said storage means, for storing a directory and respective message segment storage location set allocation data corresponding to said storage means.

13. The system of claim 12 wherein said interface means further includes means for generating command equivalent signals for selective transfer to said message channel means, said subtracting means simultaneously receiving and subtracting out any command equivalent signals received with any message or command being received from its respective message channel, whereby commands from a message channel are distinguished from command equivalent signals being transferred to the same message channel.

14. The system of claim 13 wherein each said interface processor means includes status means for storing control signals, a pair of segment buffers and buffer control means for alternately selecting said segment buffers for the receipt and sourcing of message segments, each pair of said segment buffers being accessible to said control means for the receipt or sourcing of message segments, said control means having alternating access to each said segment buffer of each said pair at co-located access locations relative to said control means, each said interface processor means separately determining the one of their respective said pair of segment buffers that can be accessed by said control means and the provision of a status control signal to said status means indicating a request for a message buffer access by said control means to source or receive a message segment.

15. A voice store and forward system for transferring messages between users of said system by access via a plurality of full duplex voice channels to provide voice messages and user commands and to receive voice messages, said system comprising:
(a) a mass storage device having a plurality of message segment storage locations, each message being stored as a set of message segments;
(b) a system control processor having an interface to said mass storage device for the transfer of message segments to and from said mass storage device and a random access memory data store, said system control processor maintaining a message directory and corresponding message segment set allocation table in said data store for use in selecting sets of said message segment storage locations for access in storing and retrieving messages to and from said mass storage device; and
(c) a plurality of interface processor units, each said interface processor unit including
a channel interface coupled to a respective one of said channels,
a transmit direction message reconstruction circuit operating at a conversion rate determined by a first clock signal,
a transmit direction command generation circuit,
an isolation circuit coupled to said channel interface for isolating a receive direction half-duplex channel,
a summation circuit coupled to said transmit direction message and command circuits for providing summed transmit direction messages and commands to said channel interface, said summation circuit coupled to said isolation circuit for subtracting transmit direction messages and commands from any messages and commands received in said receive direction half-duplex channel to distinguish user messages and commands, a receive direction message conversion circuit coupled to said summation circuit for continuously variable rate analog to digital converting received user messages, the conversion rate of said receive direction message conversion circuit being responsive to a second clock signal, a receive direction command decode circuit for decoding received user commands, a silence detection circuit coupled to said summation circuit for detecting the absence of user messages and commands for a predetermined period of time, first and second status latches separately selectable for the reading and writing of control signals, said system control processor selectably reading said first status latch and writing said second status latch, a pair of message segment buffers for temporarily storing message segments, said message segment buffers being alternately connected to said system control processor by a first address and data bus, an interface processor coupled alternately to said message segment buffers by a second address and data bus, said message segment buffers being alternately and mutually exclusively coupled to said first and second address and data busses in response to a select signal provided by said interface processor so that respective said message segment buffers alternately receive and source message segments, said interface processor being coupled to said transmit direction message reconstruction circuit to provide a message segment thereto as received from said message segment buffers, to said receive direction message conversion circuit to obtain a message segment for provision to said message segment buffers, to said receive direction command decode circuit to obtain receive commands, to said silence detection circuit to detect periods of silence, and to said first and second status latches to obtain and provide status signals, said interface processor writing control signals to said first status latch to identify the accessibility of an alternate one of said message segment buffers to said system control processor, a command issued by a user, and the end of a message, said interface processor reading said second status latch to identify said first and second clock signals and, thereby, the message segment reconstruction and conversion rates, and the transmit direction commands for generation by said transmit direction command generation circuit.

* * * * *